United States Patent [19]

Yano et al.

[11] Patent Number: 4,633,734
[45] Date of Patent: Jan. 6, 1987

[54] STEERING WHEEL

[75] Inventors: Isamu Yano; Ryoji Fujita; Hidetoshi Kitakoga, all of Kanagawa, Japan

[73] Assignee: Mitsubishi Denki Kabushiki Kaisha, Japan

[21] Appl. No.: 667,907

[22] PCT Filed: Mar. 14, 1984

[86] PCT No.: PCT/JP84/00102
§ 371 Date: Oct. 25, 1984
§ 102(e) Date: Oct. 25, 1984

[87] PCT Pub. No.: WO84/03673
PCT Pub. Date: Sep. 27, 1984

[30] Foreign Application Priority Data

Mar. 15, 1983 [JP] Japan .................................. 58-42623
Oct. 7, 1983 [JP] Japan ................................ 58-187822

[51] Int. Cl.$^4$ .............................................. B62D 1/04
[52] U.S. Cl. ..................................................... 74/552
[58] Field of Search ................................. 74/552, 558

[56] References Cited

U.S. PATENT DOCUMENTS

| | | | |
|---|---|---|---|
| 1,825,392 | 9/1931 | Geyer | 74/552 |
| 2,017,681 | 10/1935 | Burgess | 74/552 |
| 2,144,000 | 1/1939 | Seaman | 74/552 |
| 2,146,703 | 2/1939 | Husted | 74/552 |
| 2,187,604 | 1/1940 | Husted | 74/552 |
| 2,810,301 | 10/1957 | Mathues | 74/552 |
| 3,613,476 | 10/1971 | Cunningham | 74/552 X |
| 3,726,152 | 4/1973 | Tsuneizumi | 74/558 X |
| 4,118,455 | 10/1978 | Byrn | 74/558 X |
| 4,201,830 | 5/1980 | Wollen | 74/552 X |
| 4,468,978 | 9/1984 | Takahara et al. | 74/552 |

FOREIGN PATENT DOCUMENTS

| | | | |
|---|---|---|---|
| 1390424 | 1/1965 | France . | |
| 91453 | 7/1980 | Japan | 74/552 |
| 57575 | 5/1981 | Japan | 74/552 |
| 63573 | 4/1983 | Japan | 74/552 |
| 109460 | 6/1984 | Japan | 74/552 |
| 1235516 | 6/1971 | United Kingdom . | |
| 2040243 | 8/1980 | United Kingdom | 74/552 |

Primary Examiner—Alan Cohan
Assistant Examiner—John A. Rivell
Attorney, Agent, or Firm—Sughrue, Mion, Zinn, Macpeak, and Seas

[57] ABSTRACT

In a steering wheel for an automobile or the like comprising a rim, a spoke and a boss, the rim comprises a core of lightweight material and a plastic layer reinforced with unidirectional reinforcing fiber and surrounding the core, and the spoke is formed from a metal and has one end secured to the boss which is also formed from a metal, while the other end of the spoke is secured to the rim by a plastic layer reinforced with unidirectional reinforcing fiber.

7 Claims, 10 Drawing Figures

STEERING WHEEL

TECHNICAL FIELD

This invention relates to a steering wheel, and more particularly, to a steering wheel made of reinforced plastics.

BACKGROUND ART

A steering wheel for an automobile usually comprises an annular rim defining a grip, a boss connected to a steering shaft and spokes connecting the rim and the boss. It has been usual to form all of the rim, boss and spokes from carbon steel, weld the rim to the spokes and the spokes to the boss, and enclose the rim in an ornamental rubber or plastic mold. The lightest steering wheel has a weight of 2 kg, since it consists mainly of steel. It vibrates when the automobile runs at a high speed or on a bad road. The vibration of the steering wheel brings about a reduction in the stability of its operation, a discomfort to the driver and an increase in fuel consumption.

DISCLOSURE OF THE INVENTION

This invention has been made to eliminate the drawbacks of the prior art as hereinabove pointed out, and is characterized by comprising a rim having a unidirectionally fiber-reinforced plastic layer surrounding a core of lightweight material, such as a foam, and a metal spoke having one end secured to a metal boss, while the other end thereof is secured to the rim by a unidirectionally fiber-reinforced plastic layer.

This arrangement provides a lightweight and yet sufficiently strong steering wheel which has a high degree of stability in operation without vibrating when the automobile is running, and enables a reduction in fuel consumption. The steering wheel of this invention also ensures a high degree of safety, since no knife edge is formed on the spoke or boss by an impact arising from the collision of the automobile, but the impact energy is absorbed by the plastic deformation of the spoke.

BRIEF DESCRIPTION OF THE DRAWINGS

FIGS. 3 to 5 are sectional views taken along the lines A—A, B—B and C—C, respectively, of FIG. 2, FIGS. 6 and 7 illustrate another embodiment of this invention, FIG. 6 being a view corresponding to the sectional view taken along the line B—B of FIG. 2, while

BEST MODE OF CARRYING OUT THE INVENTION

Figure 3:
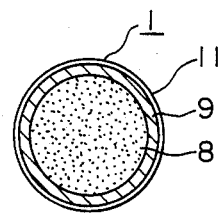
Figure 4:
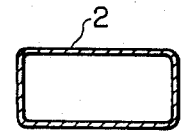
Figure 5:
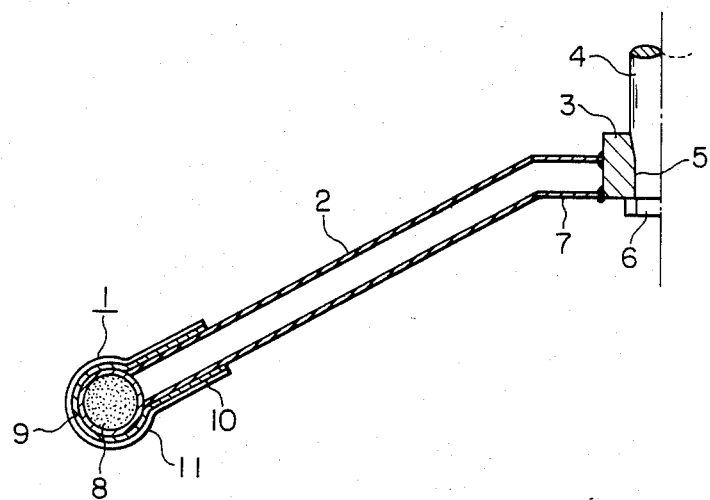

An embodiment of this invention will be described with reference to the drawings. A streeing wheel comprises an annular rim 1 forming a grip for the driver, a boss 3 for connection to a steering shaft, and a number of spokes 2 connecting the rim 1 and the boss 3, as shown in FIGS. 1 to 5. The boss 3 has a serrated portion 5 engaged about the steering shaft 4, and the shaft 4 is secured to the boss 3 by a nut 6. The rim 1 comprises a core 8 of lightweight material, such as foamed plastics or rubber, and a reinforced plastic layer 9 surrounding the core 8 and containing unidirectional fiber having a high degree of elasticity and a high degree of strength to withstand the bending and twisting moments acting on the steering wheel, such as carbon, aramid or alumina fiber, as shown in FIG. 3. The spoke 2 comprises a hollow pipe of carbon steel, aluminum, duralumin or stainless steel having a rectangular cross section as shown in FIG. 4, and has an inner end to which the boss 3, which is made of carbon steel or aluminum, is connected rigidly by welding or otherwise. The outer end of the spoke 2 is secured to the rim 1 by a reinforced plastic layer 10 containing highly elastic and strong unidirectional fiber, such as carbon fiber, as shown in FIG. 5. An ornamental mold 11 covers the rim 1 and the joint between the rim 1 and the spoke 2. The ornamental mold 11 surrounds the reinforced plastic 10 at the joint between the rim 1 and the spoke 2.

Figure 1:
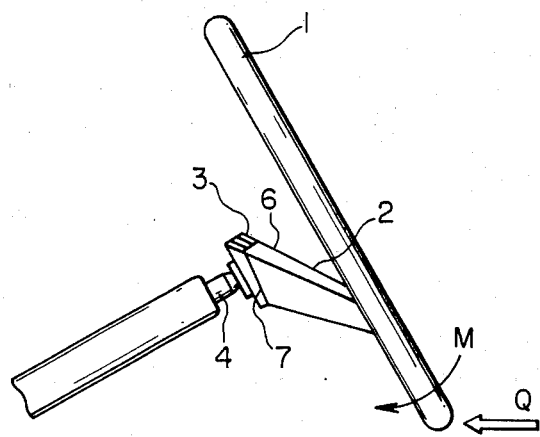
FIGS. 1 and 2 are a side elevational view and a front elevational view, respectively, of wheel embodying this invention.
Figure 2:
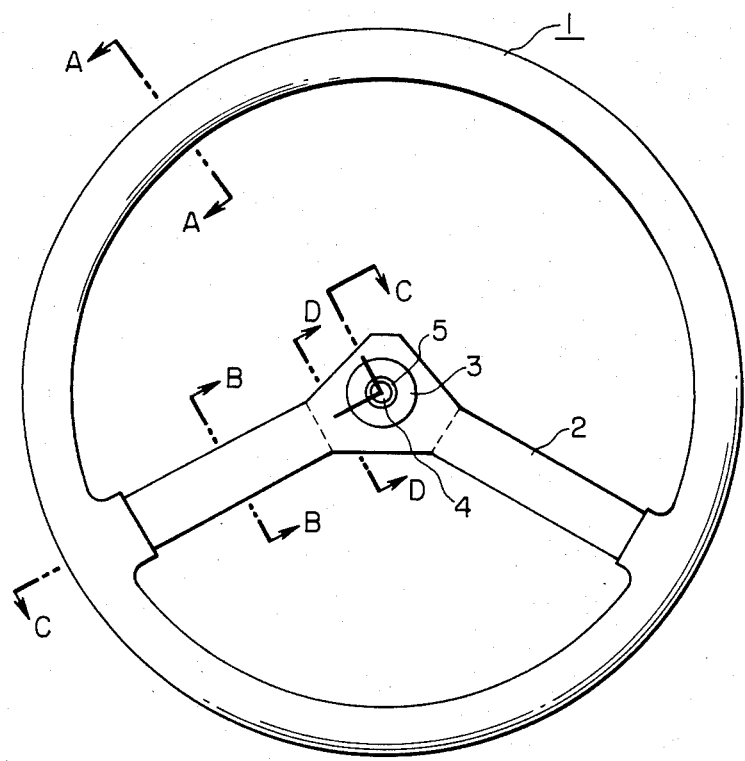

It is usually sufficient for the steering wheel to withstand the rotary and twisting moments resulting from the steering of the automobile. In the case of a collision of the automobile, however, it is likely that the driver may collide against the steering wheel and cause damage thereto, and that the steering wheel may be broken to form a knife edge which may hurt the driver. The impact energy Q of the body of the driver or the like acting on the rim 1 develops the moment M as shown in FIG. 1, and the moment M creates a maximum stress at the inner end 7 of the spoke 2 connected to the boss 3. It is appropriate to enable the plastic deformation of the spoke 2 to absorb the impact energy so that it may not cause any damage to the spoke 2 or the boss 3 or form any knife edge thereon, and so that the human body may be protected against any injury. According to the embodiment of this invention, therefore, the spoke 2 is formed from ductile carbon steel or aluminum so that it may undergo plastic deformation at its inner end 7 and thereby protect the human body against injury. The spoke 2 is strongly connected to the rim 1 by reinforced plastic 10.

The rim 1, which comprises the core 8 and the unidirectionally fiber-reinforced plastic 9 surrounding the core 8, is equal to or higher than any conventional rim in rigidity, and yet is no more than half the weight. The spoke 2 of the rectangular hollow pipe construction is light in weight and high in rigidity. This arrangement enables an increase in the natural frequency of the rim 1 and the spoke 2 and thereby an improvement in the vibration characteristics of the automobile when it runs at a high speed.

Figure 6:
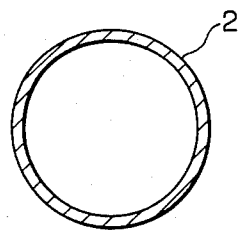
Figure 7:
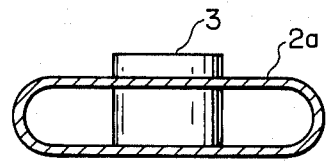
FIG. 7 is a view corresponding to the sectional view taken along the line D—D of FIG. 2.

Another embodiment of this invention is shown in FIGS. 6 and 7. The spoke 2 comprises a hollow pipe having a circular cross section, and has a flattened inner end 2a connected to the boss 3. This arrangement provides the same advantages as those already described.

Figure 8:
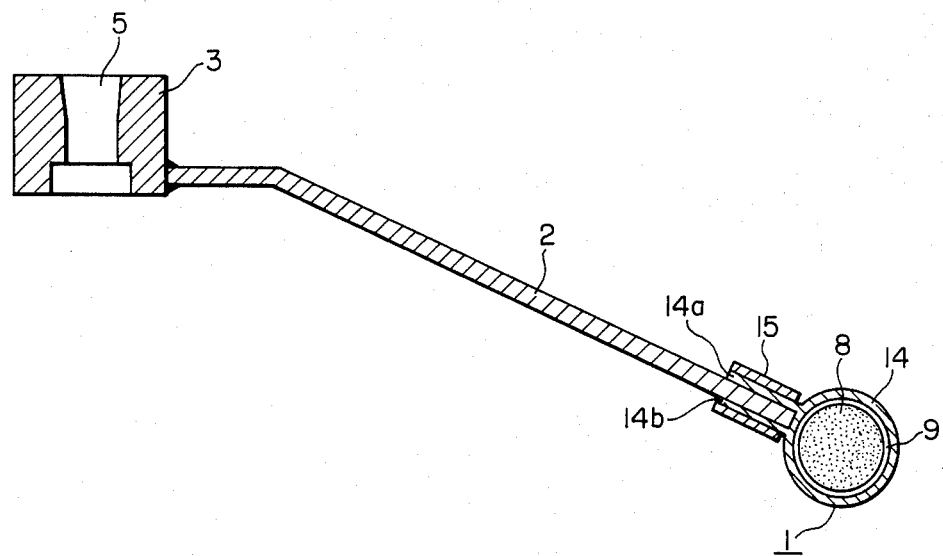
FIG. 8 is a sectional view taken along line E—E of FIG. 10 showing still another embodiment of this invention and FIGS. 9 and 10 show an example of connecting the steering wheel of the present invention to the steering column of an automobile.
Figure 9:
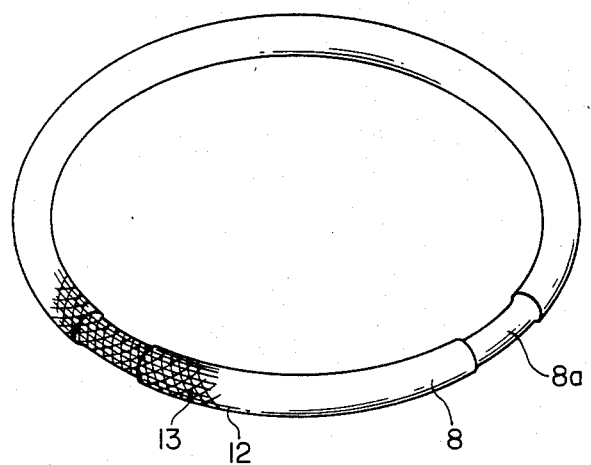
Figure 10:
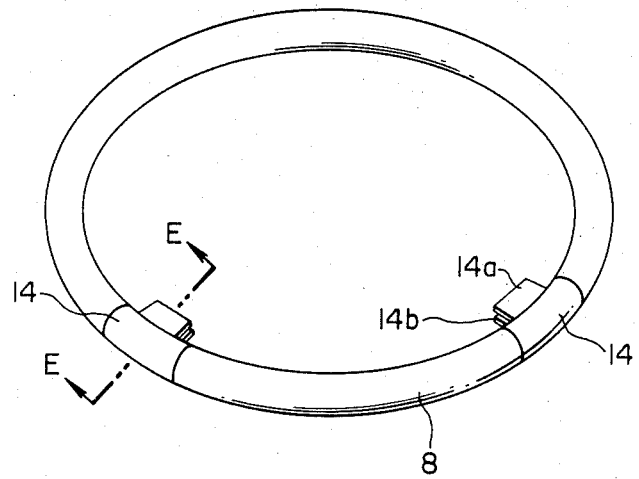

Still another embodiment of this invention is shown in FIG. 8, and includes a spoke 2 formed from a metal strip of high rigidity and having one end connected to the boss 3 strongly by welding or otherwise, while the other end thereof is secured firmly to the rim 1 by a unidirectionally fiber-reinforced plastic layer 15. FIGS. 9 and 10 illustrate a method of connecting the spoke 2 to the rim 1 by way of example. The rim comprises an annular core 8 of lightweight material, such as a urethane foam, and a continuous layer of unidirectional fiber 12, such as carbon, alumina, glass or aramid fiber, surrounding the core 8, as shown in FIG. 9. Unidirectional reinforcing fiber 13 is wound about the core material 8 so that it may extend at an angle of about 45° to the fiber 12. This work may be done by, for example, a winding machine. The reinforcing fibers 12 and 13 are impregnated with plastics, such as an epoxy or polyester resin, before, during or after their application to the core, and cured by heating to form a reinforced plastic layer 9. When the core 8 is made, it is formed with a reduced diameter portion 8a defining a joint for connection to the spoke 2. A flexible plastic connecting ring 14 reinforced with unidirectional reinforcing fiber of the type hereinbefore mentioned is fitted about the reduced diameter portion 8a. The ring 14 has a pair of parallel legs 14a and 14b between which the outer end of the spoke 2 can be disposed. The outer end of the spoke 2 is inserted between the legs of the ring 14, and unidirectional reinforcing fiber is wound about the legs. The fiber is impregnated with a plastics material, and the plastics material is cured by heating to form a reinforced plastic layer 15 in which the fiber is firmly bound.

As is obvious from the foregoing description, this invention provides a steering wheel which has a high degree of impact resistance and ensures a high degree of safety against the injury of the human body, since the spoke is formed from a ductile metal. Since the rim comprises a reinforced plastic layer surrounding the lightweight material, while the spoke is of the hollow metal construction, the steering wheel of this invention has a light weight, a high degree of rigidity and a high natural frequency, and thereby enables an improvement in the vibration and operating characteristics of the automobile and a reduction in fuel consumption.

We claim:

1. In a steering wheel comprising an annular rim forming a grip, a boss for connection to a steering shaft and a spoke connecting the rim and the boss, the improvement wherein said rim comprises a core of lightweight material and a plastic layer reinforced with unidirectional reinforcing fiber and surrounding said core, and said spoke is formed from a metal and has one end secured to said boss, said boss being formed from a metal, while the other end of said spoke is secured to said rim by a plastic layer reinforced with unidirectional reinforcing fiber.

2. A steering wheel as set forth in claim 1, wherein said spoke is of the hollow metal construction.

3. A steering wheel as set forth in claim 2, wherein said spoke comprises a hollow pipe of carbon steel, aluminum, duralumin or stainless steel having a rectangular cross section.

4. A steering wheel as set forth in claim 2, wherein said spoke comprises a hollow pipe of carbon steel, aluminum, duralumin or stainless steel having a circular cross section, except at one end thereof which has an oval cross section.

5. A steering wheel as set forth in claim 1, wherein said spoke comprises a metal strip.

6. A steering wheel as set forth in claim 1, wherein said lightweight material is plastics or rubber.

7. A steering wheel as set forth in claim 1, wherein said reinforcing fiber is carbon, aramid, glass or alumina fiber.

* * * * *